Feb. 21, 1961     T. JENSEN     2,972,369
COOLING METHOD AND MEANS FOR LAMINATING WEB MATERIALS
Filed Oct. 1, 1956
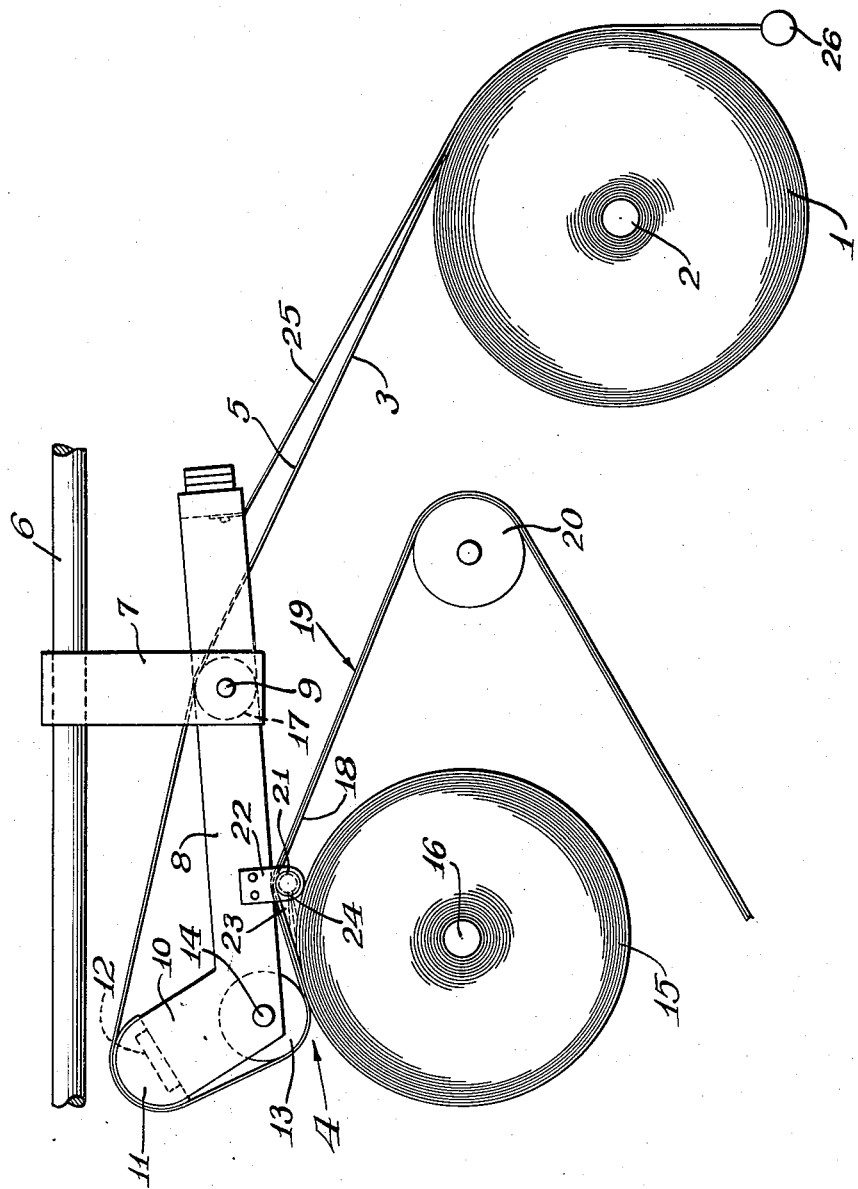
Inventor:
Thormod Jensen
By Gary, Desmond & Parker
Attys.

United States Patent Office 2,972,369
Patented Feb. 21, 1961

2,972,369

COOLING METHOD AND MEANS FOR LAMINATING WEB MATERIALS

Thormod Jensen, New York, N.Y., assignor to St. Regis Paper Company, a corporation of New York Filed Oct. 1, 1956, Ser. No. 613,202

5 Claims. (Cl. 154—1.6)

This invention relates to improvements in a method and device for laminating an easily printable web, such as a fibrous web carrying a thermoplastic adhesive, and a web of film material having thermoplastic properties, wherein the laminating operation takes place on the surface of a supply roll of said film material.

Film materials of the transparent type such as treated cellophane or the like are difficult materials upon which to print and although said materials may be successfully printed, printing thereon involves an expensive pretreating and carefully controlled printing operation. In the manufacture of wrappers wherein the advantages of such film materials as coated or treated cellophane are desired, such as, bread wrappers or the like, it has been found advantageous to adhesively unite an easily printable sheet material such as paper to the film material, the print being applied to the paper sheet materials.

An economical operation for forming such a composite web is to laminate the easily printable sheet carrying a thermoplastic adhesive upon the film material web where the film material web is withdrawn from a supply roll. That is, the film material roll comprises the bed roll upon which the lamination takes place. In carrying out the operation in this fashion, the laminating operation requires a minimum of equipment and, in addition, the laminating operation is performed without stretching or distorting the film material web as would be the case where the film material web were stripped from the supply roll prior to the laminating operation.

However, in this operation the thermoplastic adhesive carried by the easily printable sheet material must be rendered plastic by heat and must retain its plasticity until the laminating operation is completed. This requires that the easily printable web must possess heat as it contacts the film material roll a portion of which is passed to the latter. The passage of heat to the film material roll is cumulative, as the operation proceeds and eventually the outermost layers of the roll assume a temperature sufficiently high to cause blocking of the outermost layers of the film material web. Thereafter, extreme difficulty is experienced in stripping the film material web from the roll after the lamination operation is completed.

The present invention contemplates the expedient of cooling the surface of the film material roll preferably by discharging a fluid medium, such as air, into contact with the film material roll preferably adjacent the situs of the laminating line whereby a major portion of the heat transmitted to the roll by the adhesive-carrying web is dissipated, the blast of cooling fluid being preferably so directed as to also impinge upon the newly laminated composite web to facilitate the setting of the adhesive. However, the latter is not strictly essential since the composite web may be cooled remotely from the line of lamination or may be caused to travel a sufficient distance from the film material roll to permit the setting of the adhesive.

Other objects, advantages and features of the present invention will be apparent from the accompanying drawing and following detailed description.

The single drawing shows diagrammatically the use of the present invention.

In the drawing, 1 indicates a supply roll of easily printable flexible web material such as paper or the like, carried upon a core or mandrel 2 whereby free rotation of the roll may take place. A web 3 may be drawn from the roll 1 and may be passed to a laminating zone 4, as will be hereinafter more fully described. The web 3 may be previously printed and carries on its outer faces and specifically on face 5, as viewed in the drawing, an adhesive of the thermoplastic type, such as wax or the like which when heated may readily laminate the web 3 to a film material web.

A rod 6 may comprise a portion of the laminating machine and functions as a support for a strap or hanger 7 which may be movable longitudinally upon rod 6. A lever arm 8 is pivotally connected, as at 9, to the lower portion of strap 7, said arm having a portion 10 angularly offset with respect to the arm, proper. A semi-cylindrical heating shoe 11 is positioned at the outer end of the offset portion 10, the surface of said shoe being heated by a conventional electrical heating unit 12 which is connected to a suitable source of electric current (not shown). Adjacent the juncture of the offset portion 10 with arm 8, proper, a laminating roll 13 is journaled, as at 14. A roll 15 of film material is rotatably carried by mandrel 16 adjacent roll 13, the axes of roll 13 and roll 15 being substantially parallel, and during operation the laminating roll 13 rests upon the surface of the film material roll under the pressure or weight of lever arm 8.

The film material comprising the roll 15 may comprise a substantially transparent material such as cellulose acetate, cellophane or the like. For bread wrappers cellophane is preferred, but in substantially all instances the cellophane is of the treated type, that is, the type which is coated to render it substantially moistureproof or to impart other desirable properties of the basic cellulose film. These treating or modifying agents are usually thermoplastic and when heated would cause the film material web to block. Accordingly, the present process and apparatus contemplates using as a bed roll in a laminating operation a roll of film material which is thermoplastic per se or which carries a thermoplastic coating or otherwise containing a thermoplastic material which would cause the outermost layers of web material to block if heat is imparted to the roll surface.

The web 3 of easily printable material is drawn from roll 1 and is passed over guide roll 17 journaled on the lever arm pivot 9. The web 3 is then trained around the arcuate heated shoe 11 and the adhesive carried thereby is heated and brought to a plastic state, and while in such state the web is carried around a portion of laminating roll 13. A film material web 18 is drawn from the roll 15 at the line of osculation of roll 13 with roll 15 and the webs 3 and 18 are thus adhesively joined under pressure forming a composite or laminated web 19 which may then be carried around guide roll 20 and be subsequently rolled upon a driven mandrel or core or fed into a wrapping machine (not shown).

As has been hereinbefore described, the web 3 is heated by shoe 11 and while still in a heated state is brought into contacting relationship to the film material roll 15. It has been found that as the operation proceeds the heat from web 3 is transferred to the outer layers of the roll 15 and the heat thus imparted to said outer layers causes the latter to block or adhere to one another. Thus, prior to the advent of the present invention difficulty has been encountered in stripping the web 18 from the roll 15.

As a feature of the present invention, a pipe 21 is carried by a pair of spaced brackets 22 carried by arm 8, the pipe being parallel to the axis of roll 15 and being radially spaced therefrom. The composite web 19, after the laminating operation has been performed at the line of osculation of rolls 13 and 15 is carried over pipe 21 before being passed to guide roll 20. Thus, an angular-sectioned zone 23 is provided between the web 19 and the surface of roll 15. The pipe 21 is provided with a plurality of apertures 24 which preferably face into the zone 23 and said pipe may be connected by conventional means (not shown) to a source of cooling fluid under pressure, such as, air under pressure. Thus, streams of cooling fluid are continuously directed into contact with the outer layer of roll 15 adjacent the zone of lamination where web 3 imparts its heat to the outer layers of roll 15 and in this fashion the heat is dissipated and the outer layers of roll 15 are maintained at a temperature sufficiently low to prevent blocking thereof. Depending upon conditions of operation, such as the type of adhesive used, the rate of lamination, etc., the fluid fed to pipe 21 may be refrigerated, if desired.

The arrangement is such that as the diameter of roll 15 diminishes, the pivoted arm 8 swings counterclockwise and thus the laminating roll 13 follows the surface of roll 15. A tensioning strap 25 may be secured at one end to the opposite end of arm 8 and may be draped over roll 1, said strap carrying a weight 26 at its depending end. Roll 1 is thus prevented from rotating too freely and a desired degree of tension will always be imparted to web 3. In addition, the weight 26 serves as a counterbalance for arm 8 and the pressure of roll 13 upon roll 15 may be controlled.

It will also be noted that the cooling fluid discharged from pipe 21 may be caused to impinge, more or less upon the newly laminated web 19 and thus the setting of the adhesive carried thereby may be accelerated.

The cooling fluid pipe 21 may, if desired, be positioned any place along the circumference of roll 15 since the blocking of the outer layers of the film material is ordinarily not a function of a single rotation of the roll 15 but is caused over a plurality of rotations of said roll, the heat imparted thereto being cumulative. Hence, in most instances if the surface of the roll 15 is cooled at any phase of its rotation the heat will be prevented from accumulating in the outer layers thereof. Further, if desired, the surface of roll 15 may be cooled by other means, such as, a chilled contacting roll or the like, but cooling by the use of a cooling fluid, as described, is preferred.

The present invention may be thus modified and may take a number of forms obvious to those skilled in the art, being broadly directed to the concept of cooling the outer layers of a roll of film material which is thermoplastic per se or carries a thermoplastic treatment where the film material roll per se is employed as a bed roll and is subjected to heat transferred thereto by an adhesive-carrying web of easily printable sheet material.

I claim as my invention:

1. A laminating mechanism which comprises in combination a mandrel for carrying a roll of film material wound in a plurality of layers, said film material having thermoplastic properties such as to cause blocking of the wound layers when subjected to heat and pressure, a laminating roll having its axis substantially parallel to the axis of said mandrel and radially spaced therefrom, means for urging said laminating roll under pressure toward the roll of film material, a heating shoe disposed adjacent said laminating roll, means for passing a readily printable web of sheet material carrying a thermoplastic adhesive over said heating shoe and between said laminating roll and said roll of wound film material to render said adhesive plastic and while in heated plastic condition uniting the sheet material and web of film material stripped from said wound roll of film material, means for passing the united materials as a composite web away from the line of lamination at a tangent to said roll of film material, and means for cooling the surface of the roll of film material during its rotation beyond the zone of lamination.

2. In a mechanism as contemplated in claim 1 wherein the means for cooling the wound roll of film material comprises discharging a blast of cooling fluid into contact with the outer layer of the wound roll of film material.

3. A process of laminating sheet material which comprises, continuously stripping a web of film material from a wound roll thereof having a plurality of layers, said film material having thermoplastic properties such as to cause blocking of the outer layers of said material when subjected to heat and pressure, preheating a web of easily printable sheet material carrying a thermoplastic adhesive to render said adhesive plastic, laminating said latter web and said film material web while said adhesive-carrying web is still sufficiently hot to render said adhesive plastic by applying pressure upon the two webs adjacent the line of stripping of the outermost layer of said film material web from its roll, and cooling the outer layers of said latter roll beyond the zone of stripping of the film material from its supply roll.

4. A process of laminating sheet material which comprises heating a continuously passing web of easily printable sheet material carrying a thermoplastic adhesive to render said adhesive plastic, stripping a web of film material from a wound roll thereof having a plurality of layers, said film material having thermoplastic properties such as to cause blocking of the outer layers thereof when the roll is subjected to heat and pressure, bringing the heated web of adhesive-carrying material while said latter web is still in heated condition and while said adhesive is still plastic into contact with the outer layer of said film material roll, substantially simultaneously applying laminating pressure while stripping the web of film material from its roll, and cooling the outer layers of said film material roll during its rotation beyond the zone of lamination to a temperature at which blocking of said outer layers will not occur.

5. A laminating mechanism which comprises in combination a mandrel for carrying a wound roll of film material having thermoplastic properties such as to cause blocking of the outer layers thereof when subjected to heat and pressure, a lever arm, means pivotally mounting said lever arm upon a pivot disposed substantially parallel to the axis of said mandrel, a heated shoe carried by said lever arm, a laminating roll carried by said lever arm adjacent said shoe whereby said laminating roll swings toward the surface of said film material roll, means for passing a web of easily printable sheet material carrying a thermoplastic coating over said shoe to render said adhesive plastic, means for passing said adhesive-carrying web while said web is still heated and the adhesive carried thereby is still plastic between said laminating roll and said film material roll to unite said adhesive-carrying web and said film material web, means for stripping said film material web united to said adhesive-carrying web from said film material roll adjacent the line of lamination of said webs, and means for cooling the surface of said film material roll during its rotation beyond the zone of stripping of said film material from its supply roll.

References Cited in the file of this patent

UNITED STATES PATENTS

| | | |
|---|---|---|
| 2,156,241 | Jensen | Apr. 25, 1939 |
| 2,258,659 | Mosler | Oct. 14, 1941 |
| 2,335,624 | Weir | Nov. 30, 1943 |
| 2,790,480 | Lithio | Apr. 30, 1957 |

FOREIGN PATENTS

| | | |
|---|---|---|
| 1,000,816 | France | Feb. 18, 1952 |